United States Patent [19]
Mori et al.

[11] 4,370,391
[45] Jan. 25, 1983

[54] RECORDING MATERIAL

[75] Inventors: Koichi Mori; Masafumi Nakao, both of Fuji, Japan

[73] Assignee: Asahi Kasei Kogyo Kabushiki Kaisha, Osaka, Japan

[21] Appl. No.: 245,061

[22] Filed: Mar. 18, 1981

[30] Foreign Application Priority Data

Mar. 18, 1980 [JP] Japan .................. 55-34238

[51] Int. Cl.³ .................. B32B 15/04; G01D 15/10; G01D 15/34
[52] U.S. Cl. .................. 428/697; 346/76 L; 346/135.1; 346/137; 428/698; 428/701; 428/702; 428/913; 430/945
[58] Field of Search .......... 428/702, 697, 698, 701, 428/913; 430/945; 346/76 L, 135.1, 137

[56] References Cited

U.S. PATENT DOCUMENTS 3,665,483  5/1972  Becker et al. .................. 346/135.1 X
3,990,084  11/1976  Hamisch et al. .................. 430/945 X
4,188,214  2/1980  Kido et al. .................. 430/945 X

FOREIGN PATENT DOCUMENTS 151151  12/1975  Japan .................. 346/76 L
42-2774  2/1967  Japan .................. 346/76 L Primary Examiner—Thomas J. Herbert, Jr.
Attorney, Agent, or Firm—Birch, Stewart, Kolasch & Birch

[57] ABSTRACT

In a recording material which comprises a substrate, a first stabilizing layer on said substrate, a low toxicity metallic recording layer on a surface of said first stabilizing layer opposite said substrate and a second stabilizing layer on a surface of said metallic recording layer opposite said first stabilizing layer, the improvement wherein the first stabilizing layer between the substrate and the low toxicity metallic recording layer is composed of an auxiliary metal oxide layer as an upper layer and an inorganic compound layer as a lower layer for converting said auxiliary metal oxide layer to a surface-flat glassy material. Such an improved recording material can form, upon exposure to, e.g., a laser beam, excellent holes free of irregularities in shape or profile of hole.

11 Claims, 5 Drawing Figures

RECORDING MATERIAL

BACKGROUND AND SUMMARY OF THE INVENTION

This invention relates to a novel recording material. More particularly, the invention relates to an information recording material suitable for use in heat mode recording.

Information storage systems in which information is stored by selective ablation, evaporation, removal or modification of a recording medium irradiated spotwise with a focused beam of laser or the like having high density or strong energy are known as the so-called heat mode recording process to those skilled in the art. The heat mode recording process is a dry process which does not need chemicals or treating solutions and in which a real-time recording can be made. According to this process, information can be quickly recorded in the form of a high contrast image with a large capacity, i.e., the amount of information recordable per unit area of recording medium, and additional information can be recorded later. Due to such advantages, the heat mode recording process is of wide application in the field where a microimage recording medium, a computer-output microfilm, a video disk, a computer signal memory medium or the like is involved.

As materials usable for heat mode recording, there have heretofore been proposed inorganic substances such as metals and organic substances such as dyes or plastics. It is generally known that a thin film made of an inorganic substance is generally better in sensitivity for recording.

The characteristics required of a heat mode recording medium are not only high sensitivity but also a high signal-to-noise ratio, storage stability, archivability, low toxicity and the like. However, there has not yet been proposed such a recording material comprising a thin film of an inorganic substance as will meet these requirements. Recording materials using a chalcogen compound containing sulfur, selenium, tellurium or the like are satisfactory in sensitivity and a signal-to-noise ratio (hereinafter referred to as "S/N ratio") from the standard viewpoint, but involve problems as regards storage stability, achivability and toxicity. On the other hand, recording materials using bismuth, tin or the like do not present problems as regards sensitivity and toxicity but involve problems as regards an S/N ratio storage stability and archivabilty.

Further, we have previously proposed a recording material which comprises a substrate, a multi-layered metallic recording layer formed by depositing in any order bismuth, tin, lead and the like and two stabilizing layers each formed of a metal oxide such as $GeO_2$, PbO, $TiO_2$ and/or the like, the multi-layered metallic recording layer being interposed between the stabilizing layers (see Japanese Patent Application Laid-Open Specification No. 54-66147). The proposed recording material is excellent in sensitivity, but has such disadvantages that, when the recording material is selectively irradiated by a laser beam, there are formed holes having, at their respective profiles, irregularities or disorders, causing the S/N ratio to be lowered and the recording material of this kind is poor in storage stability as well as archivability at high temperatures and under high humidities, leading to fatal defects in some applications of the recording material. The term "hole" used herein is intended to mean ablated portions in which information is permanently stored by selective ablation of the recording material by means of an intensity modulated laser beam or the like.

With a view to eliminating the drawbacks accompanying the conventional heat mode recording materials and developing a new heat mode recording material which not only has a high sensitivity and a low toxicity, but also is excellent in S/N ratio, storage stability and archivability, the present inventors have made extensive and intensive researches. As a result, it has been found that when, in a recording material which comprises a substrate, a first stabilizing layer on said substrate, a low toxicity metallic recording layer on a surface of said first stabilizing layer opposite said substrate and a second stabilizing layer on a surface of said metallic recording layer opposite said first stabilizing layer, the first stabilizing layer between the substrate and the low toxicity metallic recording layer is composed of an auxiliary metal oxide layer as an upper layer and an inorganic compound layer as a lower layer for converting said auxiliary metal oxide layer to a surface-flat glassy material, that is, flat glassy material exhibiting no anisotropy in surface tension, the recording material can form, upon exposure to, e.g., a laser beam, excellent holes free of irregularities in shape or profile of hole. The present invention has been made based on such a novel finding.

Accordingly, it is an object of the present invention to provide a recording material which is excellent in sensitivity and storage stability as well as archivability.

It is another object of the present invention to provide a recording material of the above kind, which has a low toxicity.

It is a further object of the present invention to provide a recording material of the character described above, which is excellent in S/N ratio and, accordingly, in shape or profile of hole, that is free of irregularities.

BRIEF DESCRIPTION OF THE DRAWING

The foregoing and other objects, features and advantages of the present invention will be apparent to those skilled in the art from the following detailed description taken in connection with the accompanying drawings in which.

DETAILED DESCRIPTION OF THE INVENTION

Figure 1:
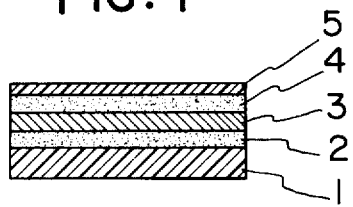
FIG. 1 is a cross-sectional view of a conventional recording material.

According to the present invention, there is provided a recording material which comprises: a substrate; and superimposed on the substrate in the following order, a first stabilizing layer; a low toxicity metallic recording layer; and a second stabilizing layer; said first stabilizing layer being composed of an auxiliary metal oxide layer as an upper layer and an inorganic compound layer as a lower layer for converting said auxiliary metal oxide layer to a surface-flat glassy material.

As examples of the substrate to be used in the present invention, there can be mentioned a film or a plate which is made of an inorganic material such as glass, mica or an alloy of aluminum; or an organic material, for example, a polymer such as polyester, polypropylene, polycarbonate, polyvinyl chloride, polyamide, polystyrene and polymethyl methacrylate or a modified polymer derived therefrom, a copolymer of monomer units of the above polymers or a blend thereof. Of such materials of the substrate, especially preferred is polyester or polymethyl methacrylate. When the smoothness of the surface of the substrate itself has a great influence on the S/N ratio of a recording material as in the case of a video disk or the like, there may be employed a substrate obtained by coating a separately prepared film or plate with the above-mentioned polymer by, for example, a spin coating technique.

As a material for forming the metallic recording layer, there may be employed any of the metals which are well known as a recording material in the art. However, in the present invention, it is preferable to employ a low toxicity metal selected from In, Bi, Sn, Zn, Pb, Mg, Au, Ge, Ga, Sb, Rh, Mn, Al and the like. From a viewpoint of sensitivity of a recording layer, it is especially preferable to employ a metal having a low melting point as well as a low reflectivity, for example, Bi, In, Sn, Pb or the like. In case the above-mentioned metals are employed in combination, it is preferable to employ such a combination as Bi-Sn or Bi-Pb because such a combination produces a eutectic having a lower melting point. The abovementioned metals may be employed in the form of either a single layer or a multiple layer. When two or more kinds of metals are employed in combination, they may be in the form of any of a single layer of an alloy, a multi-layer of respective layers of individual different metals, a multi-layer of a layer of a single metal and a layer of an alloy and the like.

In order to obtain a recording material capable of providing excellent profiles of holes as well as a high S/N ratio, it is preferable to form a multi-layer of respective layers of individual different metals. In this connection, it should be noted that according to the kinds of metals it is recommended to choose the order of formation of metal layer in order to obtain a recording material capable of providing holes having especially excellent shapes or profiles. For example, in the multi-layer system of Bi and Sn, it is preferred that a layer of Bi be first formed and a layer of Sn be then formed. In the multi-layer system of Bi and Pb, it is preferred that a layer of Bi be first formed and a layer of Pb be then formed. By doing so, there are obtained holes having especially excellent shapes.

The metallic recording layer may contain therein small amounts of oxides such as a suboxide of the metal used as far as the oxides do not spoil the necessary properties of the metallic recording layer. The acceptable amounts of oxides are not exactly known but presumed to be about 10% by weight or less in total based on the weight of the metallic recording layer.

The metallic recording layer may be formed on the surface of the first stabilizing layer by means of a conventional film-forming technique, for example, vacuum evaporation, sputtering, ion-plating, electroplating, electroless plating or plasma deposition. For example, as the method for forming a metallic layer of two kinds of metals, there may be employed a method in which an alloy of two kinds of metals is evaporation-deposited or a method in which two kinds of metals are evaporation-deposited simultaneously or separately. The thickness of the metallic recording layer may be varied according to the use of the recording material, but is preferably about 100 to 5,000 Å, more preferably 200 to 600 Å.

As the method for forming a metallic recording layer, a vacuum deposition technique is preferred because it is not only simple in operation but also excellent in reproducibility. In order to obtain a recording material having not only a high sensitivity but also excellent storage stability and archivability even at high temperatures and high humidities, it is preferable to effect deposition under high vacuum, for example, under a pressure of $10^{-5}$ Torr or less. In general, it is preferred that a metallic recording layer be of an amorphous layer. With respect to the metallic recording layer of the recording material of the present invention, there is substantially not detected any peak of crystal by X-ray diffractometry. The reason for this is believed to be such that the first stabilizing layer, at its portion contiguous to the metallic recording layer, forms a uniform glassy material. It is preferred that the rate of evaporation be as high as possible. The rate of evaporation of about 1 Å/sec or more gives better results.

The terms "first stabilizing layer" and "second stabilizing layer" are used herein to mean layers respectively provided under and over the metallic recording layer to prevent the metallic recording layer from being deteriorated by oxidation and the like. The recording material of the present invention is characterized in that the first stabilizing layer present between the substrate and the metallic recording layer is composed of two sub-layers, namely, an auxiliary metal oxide layer as an upper layer and an inorganic compound layer as a lower layer for converting said auxiliary metal oxide layer to a surface-flat glassy material.

As described, according to the present invention, there should be interposed an auxiliary metal oxide layer between the metallic recording layer and the so-called inorganic compound layer. With the layer structure of recording material in which only the layer having the same composition as that of the auxiliary metal oxide layer or only the inorganic compound layer is formed on the substrate and subsequently the metallic recording layer is formed thereon followed by deposition of a second stabilizing layer, there cannot be obtained a recording material capable of providing holes having excellent shapes or profiles.

As the constituent of the auxiliary metal oxide layer, there may be used suitable compounds selected from metal oxides. As the suitable metal oxides, there can be mentioned oxides of such elements as Be, B, Mg, Li, Al, Si, Ca, Sc, Ti, V, Cr, Mn, Fe, Co, Ni, Cu, Zn, Ga, Ge, As, Sr, Y, Zr, Nb, Tc, Ru, Rh, Pd, Ag, In, Sn, Sb, Ba, La, Hf, Ta, Re, Ir, Tl, Pb, Bi, Dy, Er, Ce, Gd, Nd, Pr and Sm. Preferred examples of metal oxides include oxides of elements such as Al, Ge, Zr, Si, Ti, Ce, Ta, La, Cr, Y, Dy, Er, Gd, Hf, Sm, Bi, Pb, Zn, Li, Mg and Sb. Especially preferred examples of metal oxides include $Al_2O_3$, $ZrO_2$, $Cr_2O_3$, $Y_2O_3$, $Sm_2O_3$, $La_2O_3$, $TiO_2$, $CeO_2$, $SiO_2$, $MgO$, $Bi_2O_3$, $GeO_2$, $PbO$, $ZnO$, $Sb_2O_3$ and the like. For forming an auxiliary metal oxide layer on the above-mentioned inorganic compound layer, a conventional film-forming technique, for example, vacuum evaporation, sputtering, ion-plating, plasma deposition or the like may be employed. Depending upon the kind of film-forming technique employed, a corresponding suboxide to the metal oxide may be formed in the auxiliary metal oxide layer. For example, when a metal oxide such as $GeO_2$ is deposited by electron beam evaporation under a high vacuum to form an auxiliary metal oxide layer, GeOx (x=1 to 2) which has been formed by partial decomposition of $GeO_2$ may occasionally be contained in the auxiliary metal oxide layer. In order to prevent such formation of suboxide during the deposition of an auxiliary metal oxide layer, the deposition may be conducted in a low-vacuum atmosphere in which air, oxygen or the like has leaked. For example, the deposition of a layer of the abovementioned metal oxide may be made, using a target of a single metal, by a reactive sputtering in which oxygen or air is used. However, a suboxide-containing auxiliary metal oxide layer has no significant problem with respect to properties of the resulting recording material.

The thickness of the auxiliary metal oxide layer may be varied depending on the kind of metal oxide formed. However, in general, if the auxiliary metal oxide layer is too thick, there are unfavorably caused cracks in the auxiliary metal oxide layer. It is preferred that the thickness of the auxiliary metal oxide layer be 10 to 3,000 Å. In order for the recording material to provide especially excellent storage stability and excellent shapes of holes to be formed, the thickness of the auxiliary metal oxide layer is preferably 30 to 300 Å.

In the recording material of the present invention, the inorganic compound layer serves to convert the auxiliary metal oxide layer formed under the metallic recording layer and on the inorganic compound layer to a surface-flat glassy material, whereby the interface between the auxiliary metal oxide layer and the metallic recording layer is rendered uniformly flat glassy and hence the surface tension of the above-mentioned interface becomes isotropic. The materials to be used for forming the inorganic compound layer may be chosen from among a wider variety of compounds than the classes of compounds which are generally known as compounds capable of forming a glassy material.

As the material to be used for forming the inorganic compound layer of the recording material of the present invention, there can be mentioned, for example, metal nitrides, metal fluorides and metal oxides. From the viewpoint of formation of a flat smooth surface of the first stabilizing layer, at its portion contiguous to the metallic recording layer, the inorganic compound layer is preferably made of a different compound from a compound used for forming the auxiliary metal oxide layer. It is further preferred that the compound used for forming the inorganic compound layer and the compound used for forming the auxiliary metal oxide layer have a solid solubility in each other. For example, when $Al_2O_3$ is employed for forming the auxiliary metal oxide layer, $GeO_2$ or $SiO_2$ is preferably employed for forming the inorganic compound layer. Specific examples of the inorganic compounds usable for forming the inorganic compound layer include nitrides, fluorides and oxides of Be, B, Al, Mg, Si, Ca, Sc, Ti, V, Cr, Mn, Fe, Co, Ni, Cu, Zn, Ga, Ge, As, Sr, Y, Zr, Nb, Tc, Ru, Rh, Pd, Ag, In, Sn, Sb, Ba, La, Hf, Ta, Re, Ir, Tl, Pb, Bi, Dy, Er, Gd, Nd, Pr, Sm or Ce. Of them, oxides of Ge, Al, Si, Pb, Zn, Ti, Y, Cr, La, Ce or Sm; and fluorides of Ca and Mg are preferable. More preferred are $Cr_2O_3$, $Y_2O_3$, $La_2O_3$, $CeO_2$, $Sm_2O_3$, $GeO_2$, $Al_2O_3$, $SiO_2$, PbO, ZnO, $TiO_2$, $MgF_2$ and $CaF_2$.

The inorganic compound layer may be formed by a thin filmforming technique such as vacuum evaporation, sputtering, ion-plating, or plasma deposition.

The inorganic compound layer is desired to be thin, and the thickness thereof may be varied depending on the kind of compound used but is preferably in the range of from 10 to 10,000 Å, more preferably in the range of from 20 to 300 Å.

Better results may be obtained when such a gas as nitrogen, oxygen, air, argon, water vapor or carbon dioxide gas is leaked into a thin film forming atmosphere at the time between the formation of the auxiliary metal oxide layer and the formation of the inorganic compound layer to effect adsorption-inclusion of such a gas in the interface between the layers or oxidation of the auxiliary metal oxide layer in the interfacial portion when oxygen or air is leaked. The above-mentioned procedure may also be carried out at the time between the formation of the auxiliary metal oxide layer and the formation of the metallic recording layer to effect similar gas adsorption-inclusion or interfacial oxidation. In some cases, such modification as mentioned above may improve the sensitivity of the resulting recording material. However, from a viewpoint of productivity, it is desirable to effect formation of all the layers at the same degree of vacuum. Some mutual diffusion of the components of the metallic recording layer and the auxiliary metal oxide layer does not substantially present any problem, but is desired to be as little as possible.

A second stabilizing layer must be provided on top of the metallic recording layer remote from the substrate in the recording material of the present invention in order to prevent the metallic recording layer from undergoing oxidation especially in the upper portion thereof. The second stabilizing layer may be made either only of an inorganic compound layer of the same kind of compound as that of the aforementioned inorganic compound layer of the first stabilizing layer, or of such an inorganic compound layer and a second auxiliary layer of the same kind of metal oxide as that of the aforementioned auxiliary metal oxide layer of the first stabilizing layer. For enhancing the effect of the second stabilizing layer, it is preferred to provide the second auxiliary layer. The disclosure given before as regards the materials, formation, thicknessess etc. of the inorganic compound layer and the auxiliary metal oxide layer of the first stabilizing layer applies to the inorganic compound layer and any second auxiliary layer of the second stabilizing layer. However, it is noted that the second stabilizing layer may be either the same as or different from the first stabilizing layer in respect of materials, formation, thickness, layer structure and the like.

When the deposition of materials is conducted under high vacuum to produce a recording material, the adhesion of the deposited layer to the substrate is excellent, leading to such a great practical advantage that the recording material is excellent in resistance to abrasion.

The recording material of the present invention may further comprise a transparent protective layer on top of the second stabilizing layer. The transparent protective layer includes an organic polymer as the main or sole component. The transparent protective layer serves to stabilize the deposited layers formed thereunder by vacuum technique and to protect the deposited layers formed thereunder from undergoing mechanical damage. The transparent protective layer, if it has a proper thickness, may also contribute to a decrease in reflectivitiy of the recording material and, hence, an increase in sensitivity of the recording material. For example, in the case where energy with a given wavelength (λ), such as laser beam, is employed for recording, the transparent protective layer is desired to have a thickness satisfying the following formula: nd=λ/4 wherein n is a refractive index of the protective layer material and d is a thickness of the protective layer.

As examples of organic polymers that may be used in the transparent protective layer, there can be mentioned polyvinylidene chloride, copolymers of vinylidene chloride and acrylonitrile, polyvinyl acetate, polyimides, polyvinyl cinnamate, polyisoprene, polybutadiene, polystyrene, polymethyl methacrylate, polyurethanes, polyvinyl butyral, fluororubbers, polyamides, polyesters, epoxy resins, silicone resins, cellulose acetate and terpolymers of vinyl acetate-vinyl butyral-vinyl alcohol; modified polymers thereof; and copolymers of monomer units of the above polymers. They may be used either alone or in mixture. Polyesters, fluororubbers and terpolymers of vinyl acetate-vinyl butyral-vinyl alcohol are especially preferred.

A silicon oil, an antistatic agent, and a crosslinking agent for improving film strength may be added to the organic polymer for the transparent protective layer. If desired, the transparent protective layer may be of a multilayer structure. An organic polymer as mentioned above and any other ingredients are dissolved in a suitable solvent to prepare a coating composition which is then applied onto the second stabilizing layer, or are melted and laminated in the form of a thin film onto the second stabilizing layer. The thickness of the transparent protective layer is preferably in the range of from 0.1 to 10μ.

Referring to the accompanying drawings, the detailed explanation of the structures and advantages of the recording material of the present invention is made as follows.

FIG. 1 shows a cross-sectional view of a conventional recording material composed of a substrate 1, a first stabilizing layer 2 of a monolayer structure, a metallic recording layer 3, a second stabilizing layer 4 of a monolayer structure, and a transparent protective layer 5. The first stabilizing layer 2 is occasionally omitted in some cases, which may depend on the kind of substrate. The transparent protective layer 5 may also be omitted in some cases.

Figure 2:
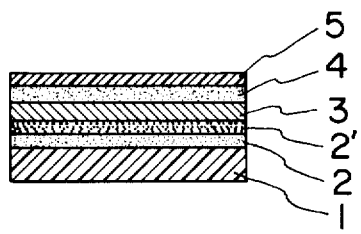
FIG. 2 is one form of a cross-sectional view of a recording material according to the present invention.

FIG. 2 shows a cross-sectional view of one form of a recording material according to the present invention which comprises a substrate 1, a first stabilizing layer composed of an inorganic compound layer 2 and an auxiliary metal oxide layer 2', a metallic recording layer 3, a second stabilizing layer 4 of a monolayer structure, and a transparent protective layer 5 which may occasionally be omitted.

Figure 3:
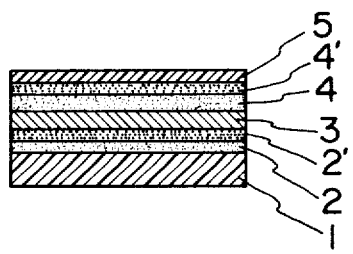
FIG. 3 is another form of a cross-sectional view of another recording material according to the present invention.

FIG. 3 shows a cross-sectional view of another form of a recording material according to the present invention which comprises a substrate 1, a first stabilizing layer composed of an inorganic compound layer 2 and an auxiliary metal oxide layer 2', a metallic recording layer 3, a second stabilizing layer composed of an inorganic compound layer 4 and a second auxiliary layer 4', and a transparent protective layer 5 which is occasionally omitted. The recording material is improved in stability by the provision of the second auxiliary layer 4'.

Figure 4:
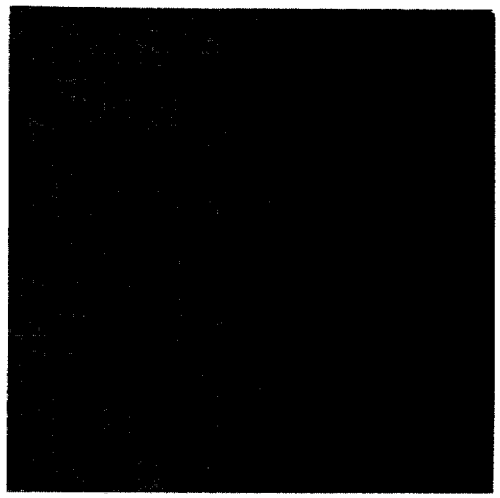
FIG. 4 is an electron micrograph showing holes ablated in the conventional recording material as shown in FIG. 1.

FIG. 4 shows an electron micrograph of the conventional recording material of FIG. 1 in which holes are formed by means of a semiconductor laser beam having a diameter of 1μ. In the recording material of FIG. 1 (prepared by Comparative Example 4 which will be given later), GeO₂ is used for forming both the first and second stabilizing layers and Bi is used for forming the metallic recording layer (400 Å-thick).

Figure 5:
FIG. 5 is an electron micrograph showing holes ablated in the recording material of the present invention as shown in FIG. 2.

FIG. 5 shows an electron micrograph of the recording material of FIG. 2 in which holes are formed by means of a semiconductor laser beam having a diameter of 1μ. In the recording material of FIG. 2 (prepared by Example 4 which will be given later) according to the present invention, Al₂O₃ is used for forming the inorganic compound layer 2, GeO₂ is used for forming each the auxiliary metal oxide layer 2' of the first stabilizing layer and inorganic compound layer 4 of the second stabilizing layer, and Bi is used for forming the metallic recording layer 3 (400 Å-thick). It is apparent from FIGS. 4 and 5 that the recording material according to the present invention is much improved in shape or profile of holes formed, for example, by means of a laser beam as compared with the conventional recording material. Illustratively stated, in FIG. 5 there are formed substantially clear elliptic holes having their respective smooth rims as opposed to FIG. 4 in which there are formed holes having irregularities or disorders in shape or profile.

The recording material of the present invention can record information thereon, for example, by a method in which the material is spot-wise or sequentially irradiated with a focussed laser beam, or by a method in which the material is irradiated, through a mask having a properly contrasted pattern as the information, with strong infrared rays in a short time, a laser beam, shortly pulsed light emitted from a xenon flash lamp, or the like. As a mask, there may be employed a chromium mask, a dry silver film or a diazo film. The recording of information on the recording material of the present invention may also be effected by contacting the metallic recording layer of the recording material with a patterned material having a different heat transfer rate and irradiating the recording material from the side of its substrate with pulsed light to form an pattern. In this case, the pattern formation utilizes a difference in heat transfer rate. The formation of spot images on the recording material of the present invention can also be effected by means of a thermal head to which energy is applied preferably in the form of pulses. In this case, the metallic recording layer is desired to have a proper thickness and a proper combination of thicknesses of metal films, if the recording layer comprises a plurality of different metal films, for the pulse width of the energy so as to form clear spot images.

Since the recording material of the present invention has a capability of forming thereon a minute pattern the material, after being subjected to pattern formation, can be used as a mask through which a photoresist composition is exposed to light to form a resist useful in the production of a master plate for a replica of video disk.

The following Examples illustrate the present invention in more detail but should not be construed as limiting the scope of the invention.

EXAMPLE 1 AND COMPARATIVE EXAMPLE 1

A disk of 30 cm in diameter formed from a smooth surface having polymethyl methacrylate plate prepared by casting was so set in vacuum deposition equipment that the disk could be rotated in the center portion of the equipment. The equipment included an electron beam vacuum evaporation apparatus having heating vaporization boats and crucibles. Bi and Sn were separately put in the heating vaporization boats, and $GeO_2$ and $Al_2O_3$ were separately put in two of the crucibles. After the equipment was pumped down to a vacuum of $2\times10^{-6}$ Torr, a 100 Å-thick film of $Al_2O_3$, a 100 Å-thick film of $GeO_2$, a 300 Å-thick film of Bi, a 100 Å-thick film of Sn, a 100 Å-thick film of $GeO_2$ and a 100 Å— thick film of $Al_2O_3$ were deposited in sequence on the disk by electron beam vacuum evaporation technique. The thickness of a film being deposited on the disk was monitored by means of a quartz oscillator, and controlled automatically in order of the materials to be deposited in sequence in accordance with a program. The deposition of all the abovementioned films was completed in about one minute. All through the vacuum evaporation, the vacuum of the equipment was $2-2\times10^{-6}$ Torr except that the vacuum was of the order of $4\times10^{-6}$ Torr at the initial stages of the oxide deposition. No positive heating of the disk was conducted during the vacuum evaporation, and substantially no increase in temperature of the disk was observed. A 0.2 $\mu$-thick layer of a polyester resin was formed on the deposited film by spin coating technique.

A semiconductor laser beam modulated to have a pulse width of $10^{-6}$ sec was condensed by means of a lens, and applied to the metallic recording layer of the so prepared recording disk being rotated at 450 rpm to effect recording. Elliptical holes of about $1\mu$ in length of minor axis were formed in the areas where the metallic recording layer was irradiated with the laser beam whose intensity examined at the surface of the recording disk was at least 4 mW. Using the resulting disk, an S/N ratio was examined by means of a spectrum analyzer to which a 500 KHz standard signal had been given, and found to be about 45 dB.

A comparative recording disk was prepared in substantially the same manner as described above except that the first and second depositions of $Al_2O_3$ were omitted so that the upper and lower stabilizing layers were made of $GeO_2$ alone. The sensitivity of the recording disk was 6 mW. In the case of this disk, an S/N ratio of 20 dB was found.

For examining storage stability with the lapse of time, both the disks were subjected to an accelerated storage test which was carried out at a temperature of 60° C. and at a relative humidity of 70%. The recording disk according to the present invention, even after being subjected to the test for one month, showed no changes in sensitivity and shape of holes formed upon irradiation with a laser beam condensed and modulated in the same manner as described above. The comparative recording disk, after being subjected to the test for only four days, showed a decrease in sensitivity and a disorder in shape of holes formed upon irradiation with the same laser beam as employed above. More specifically, the sensitivity of the comparative recording disk subjected to the four days test was 10 mW, and the holes formed upon irradiation with the laser beam had a disordered edge line. The holes recorded on each of the disk according to the present invention and the comparative disk before subjected to the test did not show any change in shape by the storage test.

EXAMPLE 2 AND COMPARATIVE EXAMPLE 2

In substantially the same manner as in Example 1, a 200 Å-thick film of $MgF_2$, a 50 Å-thick film or $Al_2O_3$, a 400 Å-thick film of Bi, a 50 Å-thick film of $MgF_2$ and a 100 Å-thick film of $Al_2O_3$ were deposited in sequence on a polymethyl methacrylate disk as formed in the same manner as in Example 1. Thus, a recording disk having upper and lower $Al_2O_3$—$MgF_2$ stabilizing layers and a Bi metallic recording layer was obtained. The lowest intensity of a laser beam capable of producing a hole in the recording layer of the disk (sensitivity) was examined in the same manner as in Example 1, and found to be 3.0 mW. In the case of this disk, an S/N ratio of 40 dB was found.

A comparative recording disk was prepared in substantially the same manner as described above except that the first and second depositions of $Al_2O_3$ were omitted so that the upper and lower stabilizing layers sandwiching the Bi layer were made of $MgF_2$ alone. The sensitivity of the comparative recording disk was 6 mW. In the case of this disk, an SN ratio of 25 dB was found.

The recording disk according to the present invention, even after being subjected to a three-week accelerated storage test carried out at a temperature of 60° C. and at a relative himidity of 70%, showed a decrease of less than 10% in sensitivity. The comparative recording disk, after being subjected to an only three day storage test carried out under the same conditions as described above, showed a marked decrease of 20% in sensitivity and a marked disorder in shape of holes formed upon irradiation with the same laser beam as employed in Example 1.

EXAMPLE 3 AND COMPARATIVE EXAMPLE 3

In substantially the same manner as in Example 1, a 100 Å-thick film of $ZrO_2$, a 50 Å-thick film of PbO, a 400 Å-thick film of Sn, a 50 Å-thick film of PbO and a 100 Å-thick film of $ZrO_2$ were deposited in sequence on a polymethyl methacrylate disk as formed in the same manner as in Example 1. Thus, a recording disk having upper and lower $ZrO_2$—PbO stabilizing layers and an Sn metallic recording layer was obtained. Sn which is liable upon vacuum evaporation to form a thin film having a structure consisting of a gathering of relatively large condensed grains could be deposited in the form of a thin film composed of considerably samll condensed grains at an increased rate of deposition. The lowest intensity of a laser beam capable of producing a hole of $1\mu$ in length of minor axis in the metallic recording layer of the disk (sensitivity) was examined in the same manner as in Example 1, and found to be 5 mW. In the case of this disk, an S/N ratio of 30 dB was found.

A comparative recording disk was prepared in substantially the same manner as described above except that the first and second films of PbO were 100 Å in thickness and that the first and second depositions of $ZrO_2$ were omitted so that the upper and lower stabilizing layers sandwiching the Sn layer were made of PbO alone. The sensitivity of the comparative recording disk was 7 mW. In the case of this disk, a S/N ratio of 30 dB was found. The comparative recording disk, after being allowed to stand at room temperature for one week, showed a marked decrease of 20% in sensitivity and a marked disorder in shape of holes formed upon irradiation with the same laser beam as employed in Example 1. However, the holes recorded on the comparative disk just after preparation thereof did not showed any change in shape by the one week storage at room temperature.

EXAMPLE 4 AND COMPARATIVE EXAMPLE 4

In substantially the same manner as in Example 1 except for some deposition conditions, a 100 Å-thick film of $Al_2O_3$, a 100 Å-thick film of $GeO_2$, a 400 Å-thick film of Bi and a 100 Å-thick film of $GeO_2$ were deposited in sequence on a polymethyl methacrylate disk as formed in the same manner as in Example 1. In the deposition of $GeO_2$, an oxygen gas was introduced into the vacuum deposition equipment so that the degree of vacuum was as low as $2 \times 10^{-3}$ Torr. In the deposition of $Al_2O_3$ and Bi, the vacuum was $2 \times 10^{-6}$ Torr. Thus, a recording disk having an upper $GeO_2$ stabilizing layer and lower $Al_2O_3$—$GeO_2$ stabilizing layers and having a Bi metallic recording layer was obtained. The lowest intensity of a laser beam capable of producing a hole in the recording layer of the disk (sensitivity) was examined in the same manner as in Example 1, and found to be 4 mW. In the case of this disk, a S/N ratio of 40 dB was found. The recording disk, after being subjected to a one week accelerated storage test carried out at a temperature of 60° C. and at a relative humidity of 70%, showed a decrease of about 10% in sensitivity.

Another recording disk was prepared in substantially the same manner as described above except that the vacuum was $2 \times 10^{-6}$ Torr in the deposition of all of $Al_2O_3$, $GeO_2$ and Bi. The sensitivity of the disk was 5 mW. In the case of this disk, a S/N ratio of 45 dB was found. The recording disk, after being subjected to a one month accelerated storage test carried out at a temperature of 60° C. and at a relative humidity of 70%, showed no decrease in sensitivity and no disorder in shape of holes formed upon irradiation with the same laser beam as employed in Example 1.

A comparative recording disk was prepared in substantially the same manner as described above with respect to the preparation of the former recording disk except that the first deposition of $Al_2O_3$ was omitted so that the upper and lower stabilizing layers sandwiching the Bi layer were made of $GeO_2$ alone. The sensitivity of the comparative recording disk was 9 mW. In the case of this disk, a S/N ratio of 25 dB was found. The comparative recording disk, after being subjected to an only seven day storage test carried out at a temperature of 60° C. and at a relative humidity of 70%, showed a marked decrease of 20% in sensitivity.

EXAMPLE 5 AND COMPARATIVE EXAMPLE 5

A 200 Å-thick film of $Si_3N_4$, a 100 Å-thick film of $Al_2O_3$, a 400 Å-thick film of Bi and a 150 Å-thick film of $GeO_2$ were deposited in sequence according to the under-mentioned procedures on a polymethyl methacrylate disk as formed in the same manner as in Example 1. The deposition of $Si_3N_4$ was carried out using a customary glow discharge technique. On the other hand, the depositions of $Al_2O_3$, Bi and $GeO_2$ were carried out using a vacuum evaporation under a vacuum of $2 \times 10^{-6}$ Torr. Thus, a recording disk having lower $Si_3N_4$—$Al_2O_3$ stabilizing layers, a Bi metallic recording layer and a $GeO_2$ upper stabilizing layer was obtained. The lowest intensity of a laser beam capable of producing a hole in the recording layer of the disk (sensitivity) was examined in the same manner as in Example 1, and found to be 4 mW. In the case of this disk, an S/N ratio of 40 dB was found.

A comparative recording disk was prepared in substantially the same manner as described above except that the first deposition of $Si_3N_4$ was omitted so that the upper and lower stabilizing layers sandwiching the Bi layer were made of $GeO_2$ and $Al_2O_3$, respectively. The sensitivity of the comparative recording disk was 6 mW. In the case of this disk, an S/N ratio of 35 dB was found.

The recording disk according to the present invention, after being subjected to a one-week accelerated storage test carried out at a temperature of 60° C. and at a relative himidity of 70%, showed a decrease of less than 15% in sensitivity. The comparative recording disk, after being subjected to an only three day storage test carried out under the same conditions as described above, showed a marked decrease of 15% in sensitivity.

EXAMPLE 6 AND COMPARATIVE EXAMPLE 6

In substantially the same manner as in Example 1, a 100 Å-thick film of $CaF_2$, a 80 Å-thick film of $Al_2O_3$, a 200 Å-thick film of Bi, a 50 Å-thick film of Sn, a 100 Å-thick film of Bi, a 80 Å-thick film of $CaF_2$ and a 100 Å-thick film of $Al_2O_3$ were deposited in sequence on a polymethyl methacrylate disk as formed in the same manner as in Example 1. Thus, a recording disk having upper and lower $Al_2O_3$—$CaF_2$ stabilizing layers and a Bi(200 Å)—Sn(50 Å)—Bi(100 Å) metallic recording layer was obtained. The lowest intensity of a laser beam capable of producing a hole in the recording layer of the disk (sensitivity) was examined in the same manner as in Example 1, and found to be 4 mW. In the case of this disk, an S/N ratio of 40 dB was found.

A comparative recording disk was prepared in substantially the same manner as described above except that the first and second films of $CaF_2$ were 100 Å in thickness and that the first and second depositions of $Al_2O_3$ were omitted so that the upper and lower stabilizing layers sandwiching the Bi—Sn—Bi layer were made of $CaF_2$ alone. The sensitivity of the comparative disk was 8 mW. In the case of this disk, a S/N ratio of 25 dB was found.

EXAMPLE 7

A 100 Å-thick film of $Al_2O_3$ and a 50 Å-thick film of $GeO_2$ constituting in cooperation a lower stabilizing layer were deposited by reactive sputtering technique on a polymethyl methacrylate disk as formed in the same manner as in Example 1, the reactive sputtering being carried out using an Al target and a Ge target under a vacuum of $3 \times 10^{-3}$ Torr with air being introduced into the sputtering zone. A 300 Å-thick film of Au was deposited on top of the lower stabilizing layer by vacuum evaporation technique under a vacuum of $10^{-6}$ Torr. A 50 Å-thick film of $GeO_2$ and a 100 Å-thick film of $Al_2O_3$ constituting in cooperation an upper stabilizing layer were deposited on the deposited Au film by the same reactive sputtering technique as employed above. The sensitivity of the resulting recording disk was examined in the same manner as in Example 1, and found to be 5 mW. In the case of this disk, an S/N ratio of 45 dB was found.

EXAMPLE 8 AND COMPARATIVE EXAMPLE 6

In substantially the same manner as in Example 1, a 200 Å-thick film of $ZrO_2$, a 200 Å-thick film of $Y_2O_3$, a 300 Å-thick film of Bi, a 100 Å-thick film of Pb, a 100 Å-thick film of $Y_2O_3$ and a 100 Å-thick film of $ZrO_2$ were deposited in sequence on a polymethyl methacrylate disk as formed in the same manner as in Example 1. A 0.5 μ-thick protective layer of a fluororubber was formed thereon by coating. Thus, a recording disk having upper and lower $ZrO_2$—$Y_2O_3$ stabilizing layers and a Bi(300 Å)—Pb(100 Å) metallic recording layer was obtained. The sensitivity of the recording disk was examined in the same manner as in Example 1, and found to be 4 mW. In the case of this disk, a S/N ratio of 40 dB was found. The recording disk, after being subjected to an even 30 day accelerated storage test carried out at a temperature of 60° C. and at a relative humidity of 70%, did not show any decrease in sensitivity and any disorder in shape of a hole formed upon irradiation with the same laser beam as employed in Example 1.

A comparative recording disk was prepared in substantially the same manner as described above except that the first and second films of $ZrO_2$ were 200 Å in thickness instead of 100 Å and that the first and second depositions of $Y_2O_3$ were omitted so that the upper and lower stabilizing layers sandwiching the Bi—Pb layer were made of $ZrO_2$ alone. The sensitivity of the comparative recording disk was 8 mW. In the case of this disk, a S/N ratio of 25 dB was found.

The comparative recording disk, after being subjected to an only three day accelerated storage test carried out under the same conditions as described above, showed some decrease in sensitivity and some disorder in shape of holes formed upon irradiation with the same laser beam as employed in Example 1.

What is claimed is:

1. A recording material, comprising: a substrate; and superimposed on top of the substrate in the following order, a first stabilizing layer; a low toxicity metallic recording layer; and a second stabilizing layer; said first stabilizing layer being composed of an auxiliary metal oxide layer as an upper layer and an inorganic compound layer formed of an inorganic compound selected from the group consisting of a metal oxide, a metal nitride and a metal fluoride as a lower layer for converting said auxiliary metal oxide layer to a surface-flat glassy material, wherein when said inorganic compound layer is a metal oxide, the metal oxide of the auxiliary metal oxide layer is different from the metal oxide of the inorganic compound layer.

2. A recording material according to claim 1, wherein the inorganic compound of the inorganic compound layer and the metal oxide of the auxiliary metal oxide layer have a solid solubility in each other.

3. A recording material according to claim 1, wherein said metallic recording layer comprises at least one metal selected from the group consisting of In, Rh, Bi, Sn, Pb, Zn, Mg, Au, Mn, Al, Ge, Ga and Sb.

4. A recording material according to claim 1, wherein the metal oxide of said auxiliary metal oxide layer is an oxide of a metal selected from the groups consisting of Al, Ge, Zr, Si, Ti, Cr, Ta, La, Ce, Y, Dy, Er, Gd, Hf, Sm, Bi, Pb, Zn, Li, Mg and Sb.

5. A recording material according to claim 1, wherein the inorganic compound of said inorganic compound layer is selected from the group consisting of $MgF_2$, $CaF_2$, $GeO_2$, $Al_2O_3$, $Cr_2O_3$, $SiO_2$, $TiO_2$, $PbO$, $ZnO$, $Y_2O_3$, $Sm_2O_3$, $La_2O_3$ and $CeO_2$.

6. A recording material according to claim 1, wherein said metallic recording layer is formed of a metal having a low melting point as well as low reflectivity.

7. A recording material according to claim 1, wherein said metallic recording layer is a combination of two metals which produce a eutectic.

8. A recording material according to claim 1, wherein said second stabilizing layer comprises an inorganic compound layer of a member selected from the group consisting of a metal oxide, a metal nitride and a metal fluoride.

9. A recording material according to claim 8, wherein said second stabilizing layer further comprises a second auxiliary layer of a metal oxide and wherein the metal oxide of the second auxiliary layer is different from the inorganic compound of the inorganic compound layer of the second stabilizing layer.

10. A recording material according to claim 1, 2, 3, 4, 5, 8, 9, 6 or 7 in the form of a video disk.

11. A video disk according to claim 10, having information having a high S/N ratio stored thereon by means of a laser beam.

* * * * *